(12) United States Patent
Borissov et al.

(10) Patent No.: US 11,391,247 B1
(45) Date of Patent: Jul. 19, 2022

(54) LIQUID ROCKET ENGINE COOLING CHANNELS

(71) Applicant: FireFly Aerospace Inc., Cedar Park, TX (US)

(72) Inventors: Anatoli Alimpievich Borissov, Sugar Land, TX (US); Thomas Edward Markusic, Georgetown, TX (US)

(73) Assignee: FIREFLY AEROSPACE INC., Cedar Park, TX (US)

( * ) Notice: Subject to any disclaimer, the term of this patent is extended or adjusted under 35 U.S.C. 154(b) by 61 days.

(21) Appl. No.: 16/256,210

(22) Filed: Jan. 24, 2019

(51) Int. Cl.
*F02K 9/64* (2006.01)
*F02K 9/97* (2006.01)
*F02K 9/52* (2006.01)
*F02K 9/62* (2006.01)

(52) U.S. Cl.
CPC ............... *F02K 9/972* (2013.01); *F02K 9/52* (2013.01); *F02K 9/62* (2013.01); *F02K 9/64* (2013.01)

(58) Field of Classification Search
CPC ... F02K 9/62; F02K 9/64; F02K 9/972; F02K 9/52
See application file for complete search history.

(56) References Cited

U.S. PATENT DOCUMENTS

| 2,531,761 | A |   | 11/1950 | Zucrow |
| 2,558,483 | A |   | 6/1951 | Goddard |
| 2,558,484 | A | * | 6/1951 | Goodard ............... F02K 9/64 |
|   |   |   |   | 60/730 |
| 2,659,195 | A |   | 11/1953 | Mirko |
| 2,749,706 | A |   | 6/1956 | Goddard |
| 3,035,333 | A |   | 1/1959 | Baehr |
| 2,880,577 | A |   | 4/1959 | Leonard |
| 2,977,754 | A |   | 4/1961 | Bell, Jr. |
| 3,043,103 | A |   | 7/1962 | Dent et al. |

(Continued)

FOREIGN PATENT DOCUMENTS

| DE | 1197689 | 7/1965 |
| DE | 10054333 | 5/2002 |

(Continued)

OTHER PUBLICATIONS

Urade, Atul, Review on Heat Transfer Enhancement Using the Wavy Fin, Nov. 2015, Internation Engineering Research Journal (Year: 2015).*

(Continued)

*Primary Examiner* — Todd E Manahan
*Assistant Examiner* — Kyle Robert Thomas
(74) *Attorney, Agent, or Firm* — Zagorin Cave LLP; Robert W. Holland (57) ABSTRACT

A liquid rocket engine cools a thruster body by pumping propellant through cooling channels integrated in the thruster body between internal and external surfaces. One or more of the cooling channel surfaces has a variable depth along a thrust axis to mix propellant flow and destroy thermal stratification, such as a depth that varies with a repeated contiguous sinusoidal form along the thrust axis. Fuel passed through the cooling channels injects from the combustion chamber wall towards a central portion of the combustion chamber to cross impinge with oxygen injected at the combustion chamber head so that a toroidal vortex forms to enhance propellant mixing.

17 Claims, 9 Drawing Sheets

(56) References Cited

U.S. PATENT DOCUMENTS

| | | | |
|---|---|---|---|
| 3,127,737 A * | 4/1964 | Ledwith | F02K 9/972 29/455.1 |
| 3,127,738 A | 4/1964 | Augustus et al. | |
| 3,134,224 A | 5/1964 | Lippincott | |
| 3,161,378 A | 12/1964 | Frederick et al. | |
| 3,188,203 A | 6/1965 | Peaslee | |
| 3,413,810 A | 12/1968 | Kaufinann | |
| 3,695,515 A * | 10/1972 | Stockel | F02K 9/64 60/260 |
| 3,699,772 A | 10/1972 | Elverum, Jr. | |
| 3,710,574 A | 1/1973 | Pearson | |
| 3,768,256 A | 10/1973 | Butter | |
| 4,485,866 A * | 12/1984 | Hemmerich | F28D 9/0018 165/90 |
| 5,014,508 A | 5/1991 | Lifka | |
| 5,172,548 A | 12/1992 | Dubedout et al. | |
| 5,622,046 A | 4/1997 | Michaels et al. | |
| 6,860,099 B1 | 3/2005 | Xenofos et al. | |
| 7,343,732 B2 * | 3/2008 | Hewitt | F02K 9/64 239/127.1 |
| 7,503,511 B2 | 3/2009 | Mueller | |
| 7,603,843 B2 | 10/2009 | Froehlich | |
| 8,292,217 B2 | 10/2012 | Smith | |
| 9,249,758 B2 | 2/2016 | Conrardy | |
| 10,927,793 B2 | 2/2021 | Gabaldo | |
| 2006/0144959 A1 * | 7/2006 | Hewitt | F02K 9/64 239/127.1 |
| 2008/0121548 A1 | 5/2008 | Yousefiani | |
| 2013/0219719 A1 | 8/2013 | Sisk | |
| 2014/0325958 A1 | 11/2014 | Conrardy | |
| 2015/0308384 A1 | 10/2015 | Barthoulot et al. | |
| 2018/0119644 A1 | 5/2018 | Gabaldo et al. | |

FOREIGN PATENT DOCUMENTS

| | | |
|---|---|---|
| DE | 10156124 | 6/2003 |
| GB | 2190964 A | 12/1987 |
| WO | 2002/055864 | 7/2002 |

OTHER PUBLICATIONS

Sui, Y. Fluid flow and heat transfer in wavy microchannels, Mar. 19, 2010, International Journal of Heat and Mass Transfer (Year: 2010).*

Pillow, C.E., Altitude Developmental Testing of the J-2S Rocket Engine in Rocket Development Test Cell (J-4) (Tests J4-1001-06, -07, -11, and -15), Sep. 1970, 118 pages.

Wikipedia, "Air-Augmented Rocket," downloaded from https://en.wikipedia.org/wiki/Air-augmented_rocket on Apr. 24, 2020, 5 pages.

Wikipedia, "Ramjet," downloaded from https://en.wikipedia.org/wiki/Ramjet on Apr. 24, 2020, 15 pages.

Sutton, G. and BIBLARZ, O., "Rocket Propulsion Elements" Seventh Edition, 2001, 764 pages.

Sutton, G. and BIBLARZ, O., "Rocket Propulsion Elements" Eighth Edition, 2010, 8 pages.

Orr, G.J., XCompute: Advanced Systems for Complex Science & Engineering, Apr. 19, 2018, 47 pages.

Borissov, A., "Our Wavy Cooking Channels Design Also Confirmed by Artificial Intelligent," Adrian Bejan & Constructal Law, Mar. 9, 2022, 3 pages.

* cited by examiner

LIQUID ROCKET ENGINE COOLING CHANNELS

STATEMENT REGARDING FEDERALLY SPONSORED RESEARCH OR DEVELOPMENT

This invention was made with Government support under Agreement No. HR0011-16-9-0011, awarded by DARPA. The Government has certain rights in the invention.

BACKGROUND OF THE INVENTION

Field of the Invention

The present invention relates in general to the field of liquid rocket propulsion, and more particularly to liquid rocket engine cooling channels.

Description of the Related Art

Liquid rocket engines generate thrust by burning fuel, such as kerosene, mixed with liquid oxygen in a combustion chamber at extremely high temperatures and pressures, such as 3500 degrees Kelvin and 1,000 pounds per square inch (psi). Exhausting the hot gas from the combustion chamber through a throat and out a nozzle produces a supersonic airflow that generates thrust. Generally, to lift off the ground, thrust generated by the rocket exhaust must exceed the weight of the rocket, including the rocket payload (i.e., a satellite) weight, structural weight and the weight of fuel and liquid oxygen carried by the rocket to generate thrust. Minimizing structural weight and efficiently using fuel and liquid oxygen to generate thrust increases payload weight of the rocket. Stated another way, payload weight generally increases by decreasing the weight of rocket structure and the amount of fuel and liquid oxygen needed at lift off to achieve desired orbital height and characteristics.

Combustion chamber temperatures of a liquid rocket engine typically exceed the melting temperature of combustion chamber wall materials, which generally have a melting temperature falling in a range of 1200 to 1700 degrees Kelvin. Generally, liquid rocket engines provide cooling at combustion chamber walls to maintain temperatures of the wall material below defined constraints, such as a temperature of one-third of the material melting point, so that combustion chamber walls do not weaken under high pressures found within the combustion chamber. For example, propellant, such as kerosene fuel and in some cases liquid oxygen, flows through cooling channels formed in the combustion chamber walls to remove thermal energy in the wall next to the combustion chamber and reject the thermal energy through the wall to the external environment. Generally, cooling channels of conventional liquid rocket engines have straight sides or a helical/spiral shape. Some examples of such cooling channels are described in U.S. Pat. No. 7,603,843, issued to Weldon et al., European Patent Application EP1203879 issued to Bichler et al., German Patent Application DE10156124 issued to Hensel, and World Patent Application WO 2002/055864 issued to Haggander. Ideally, combustion chamber cooling channels provide a maximum heat flux rejection from a heated surface at the combustion chamber with a minimum pressure drop of the fuel passing through the cooling channels. High heat flux rejection and low pressure drop are contradictive goals according to Reynolds Analogy. Generally, high pressure flows through cooling channels have thermal boundary layers that reduce thermal transfer across the flow from an inner surface proximate the combustion chamber to an outer surface proximate the external environment. The boundary layers stratify temperatures across the flow so that higher temperature fuel located proximate the combustion chamber does not mix efficiently with lower temperature fuel of the rest of the flow.

To maintain adequate pressure and flow of propellant through combustion chamber cooling channels, liquid rocket engines typically include a turbopump that pressurizes propellant to flow through the cooling channels. Typical turbopumps used by liquid rocket engines utilize a separate hot gas generator that consumes three to eight percent of the total propellant of a rocket launch. For instance, a typical gas generator is itself a rocket engine that burns fuel and liquid oxygen to run a pump that pressurizes fuel flowing through cooling channels. The size and weight of the turbopump and the amount of fuel used by the turbopump depend upon the amount of pressurization to produce requisite thrust and flow which is needed within the cooling channels to maintain combustion chamber walls within temperature constraints. Increased turbopump size, weight and propellant consumption tend to decrease rocket payload weight. Inadequate pressurization of propellant within cooling channels can lead to catastrophic failure since vaporization of a fluid within a cooling channel substantially decreases thermal transfer properties.

A liquid rocket engine turbopump feeds propellant, such as kerosene and liquid oxygen, into the combustion chamber at very high pressures. Ideally, fuel and oxygen completely burn to generate energy so that an efficient amount of the propellant weight translates into creation of thrust. Incomplete mixing of propellant, incomplete burning of propellant and uneven propellant flow through the combustion chamber can result in hot spots forming at the combustion chamber wall, which may lead to catastrophic failure. To encourage propellant mixing and atomization, liquid rocket engines tend to use a variety of injectors, such as are explained in "Rocket Propulsion Elements" by George P. Sutton and Oscar Biblarz, Seventh Edition, pages 217-276. For example, injection heads relying on coaxial, swirl or oblique jet injection methods are used with a goal of attaining complete combustion within a low combustion chamber volume by encouraging a homogenous gas mixture, high combustion stability and low injection pressure losses. Ideally combustion flame is located relatively far from the combustion chamber walls to reduce the convective component of heat flux acting on the combustion chamber and injector walls.

One difficulty with coaxial, swirl and oblique jet injection methods is that propellant strands can form in the combustion chamber having a rich combustion due to an excess of fuel or a lean combustion due to an oxidation excess. Propellant strand formation impairs combustion efficiency by leaving propellant unconsumed and may also lead to hot-gas corrosion or spot-type excess temperatures, which can destroy the combustion chamber wall. If thermally decomposable fuel is involved, strands with an excess of fuel may lead to local pressure peaks, which can cause high-frequency combustion instabilities. Injection heads tend to include interfaces between fuel and oxygen made by complicated and expensive manufacture techniques to ensure no contact between the fuel and oxygen. For example, injectors are often manufactured with expensive heat resistant material to withstand high temperatures generated proximate propellant combustion.

SUMMARY OF THE INVENTION

Therefore, a need has arisen for a system and method which increases thermal transfer from a combustion chamber wall across a propellant flow within cooling channels integrated in the combustion chamber wall and out of the cooling channels to an external environment.

A further need exists for a system and method that injects propellant into a liquid rocket engine combustion chamber with cross impinged propellant jets to mix propellant with a flow field having a toroidal vortex.

In accordance with the present invention, a system and method are provided which substantially reduce the disadvantages and problems associated with previous methods and systems for thermal transfer from a liquid rocket combustion chamber wall. Variable depth cooling channel surfaces destroy propellant flow thermal stratification by mixing heated layers of propellant from lateral surfaces of a cooling channel proximate a combustion chamber interior wall with cooler layers of propellant distal the combustion chamber interior wall. Reduced propellant flow thermal stratification increases the temperature gradient between the lateral surface proximate the combustion chamber and propellant within the cooling channel relative to the temperature gradient provided by an unmixed propellant flow, thus increasing thermal transfer from the combustion chamber wall material to the propellant.

A further system and method are provided that enhance combustion chamber performance using cross impinged propellant injection. Fuel and oxygen inject at a combustion chamber headend in opposing directions so that fuel and propellant impinge at one or more locations to establish toroidal vortex flow patterns that mix propellant in an efficient manner and manage thermal conditions proximate the headend. Fuel injects through drilled injection ports formed at the end of each cooling channel reverse flow along one or more injection angles directed towards the center of the combustion chamber. Oxygen injects from in an oxygen injector coupled to the headend of the combustion chamber and having a hemispherical shape with ports drilled in rows to direct oxygen from a central position of the combustion chamber towards walls of the combustion chamber. Impingement of the fuel and oxygen injection streams for a toroidal vortex in a donut shape between the oxygen injector and the combustion chamber walls that enhances propellant mixing and combustion.

More specifically, a liquid rocket engine has a thruster body that defines a combustion chamber, throat and nozzle. Burning fuel and liquid oxygen within the combustion chamber create a high temperature and pressure gas that generates a supersonic gas flow along a thrust axis by passing through the throat and out the nozzle. Cooling channels milled into the thruster body and covered with galvanic metal direct a flow of propellant along the thrust axis and across the thruster body to absorb thermal energy from the thruster body. A double pass channel flow configuration directs propellant flow from the combustion chamber, past the throat to an end of the nozzle and then back to the combustion chamber for cross impinged propellant injection, with passage through narrow portions at the throat supported by joining and separating cooling channels as the circumference changes through the throat. The cooling channels include one or more inner surfaces that define a variable depth, such as with a sinusoidal form, to mix propellant flow and destroy thermal stratification so that the bulk propellant temperature is made uniform. For example, a sine wave form milled into the thruster body has a variable depth of substantially 20 percent of the average depth of the cooling channel and a wavelength of substantially 10 times the average depth of the cooling channel. In various embodiments, the variable depth of the cooling channel may be defined at one or more of the lower surface of the cooling channel proximate the thruster body interior, the upper surface of the cooling channel proximate the thruster body exterior, and/or the side walls that separate cooling channels from each other. Where multiple cooling channel surfaces have the sinusoidal form, opposing faces of the cooling channel may be in phase or out of phase. In one example embodiment, cooling channels that pass through thruster body portions having varied circumferences, such as between the combustion chamber and the throat, use convergent and divergent paths to maintain desired cooling channel width dimensions.

Fuel injection ports are formed on lateral walls of the combustion chamber, such as by drilling through the combustion chamber wall at the termination of each reverse cooling channel flow. Liquid fuel jets emanate from the ports directed towards a central position of the combustion chamber to cross oxygen injection jets emanating from an oxygen injector coupled to the combustion chamber headend. Cross impingement of the fuel and oxygen jets from plural ports with dimensions allowing achievement of desired velocity and mass flow rates for a given oxygen to fuel mass ratio occurs at geometric locations within the combustion chamber to form one or more toroidal vortex flows. A combustion flame front and combustion flow field defined by the vortex flow establishes stable combustion with a flame holder within the vortex and centrifugal mixing by the vortex of propellant for efficient fuel combustions distal the combustion chamber wall and headend.

The present invention provides a number of important technical advantages. One example of an important technical advantage is an increased payload weight supported by a liquid rocket engine due to reduced turbopump size, weight and propellant consumption. Cooling channels integrated in the combustion chamber wall improve heat transfer from the combustion chamber wall by increasing the unsteadiness of boundary layers in a propellant flow that passes through the cooling channels. Improved thermal transfer through the propellant flow reduces flow rate and pressurization of propellant through the cooling channels needed to maintain combustion chamber walls within a desired temperatures constraint, such as not greater than one-third the melting temperature of the combustion chamber material. As a result, the payload weight supported by the liquid rocket engine for a given orbit is increased due to the decreased weight in propellant and equipment need to achieve the orbit.

Another example of an important technical advantage is that fuel and oxygen injection into a combustion chamber are supported with a simplified and cost efficient construction. For example, fuel and oxygen injection ports are drilled through material without coupling specialized injector structures in the combustion chamber. Combustion location and propellant mixing are defined with cross impinged injection streams that form one or more vortexes within the combustion chamber. Vortex flow separates combustion zones having separate fuel mixture ratios and flow patterns. Within the vortex, oxygen-rich flow centrifugally mixes with a part of the injected fuel to encourage full and efficient combustion in the vortex. As oxygen flow extends out of the vortex and into an axial flow towards the nozzle for exhaust, addition combustion is encouraged with a central portion of the combustion chamber. Oxygen flow reduces thermal transfer to the combustion chamber headend and the oxygen injector to provide thermal management without expensive and complex injector structures.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Variation in depth of cooling channels integrated in a liquid rocket engine thruster body mixes thermally-stratified layers of propellant flow passing through the cooling channels to improve thermal rejection from the thruster body compared against conventional cooling channels. For example, variations in cooling channel depth includes repeated continuous patterns, such as wavy cooling channels having periodical variable depth of a sine wave form. In one example embodiment, wavelength and amplitude of a cooling channel surface are proportional to an average cooling channel depth. A sinusoidal wave surface shape along a cooling channel destroys coolant stratification by moving hot layers from lateral surfaces near a thruster body interior surface and mixing the hot layer of coolant with cooler layers so that the bulk temperature of the coolant is made uniform and thermal transfer from the thruster body interior surface to the coolant increases. The overall effect is to improve thermal rejection to such an extent that it permits reduced turbopump size and turbopump propellant consumption, thus effectively increasing liquid rocket engine payload capability.

Figure 1:
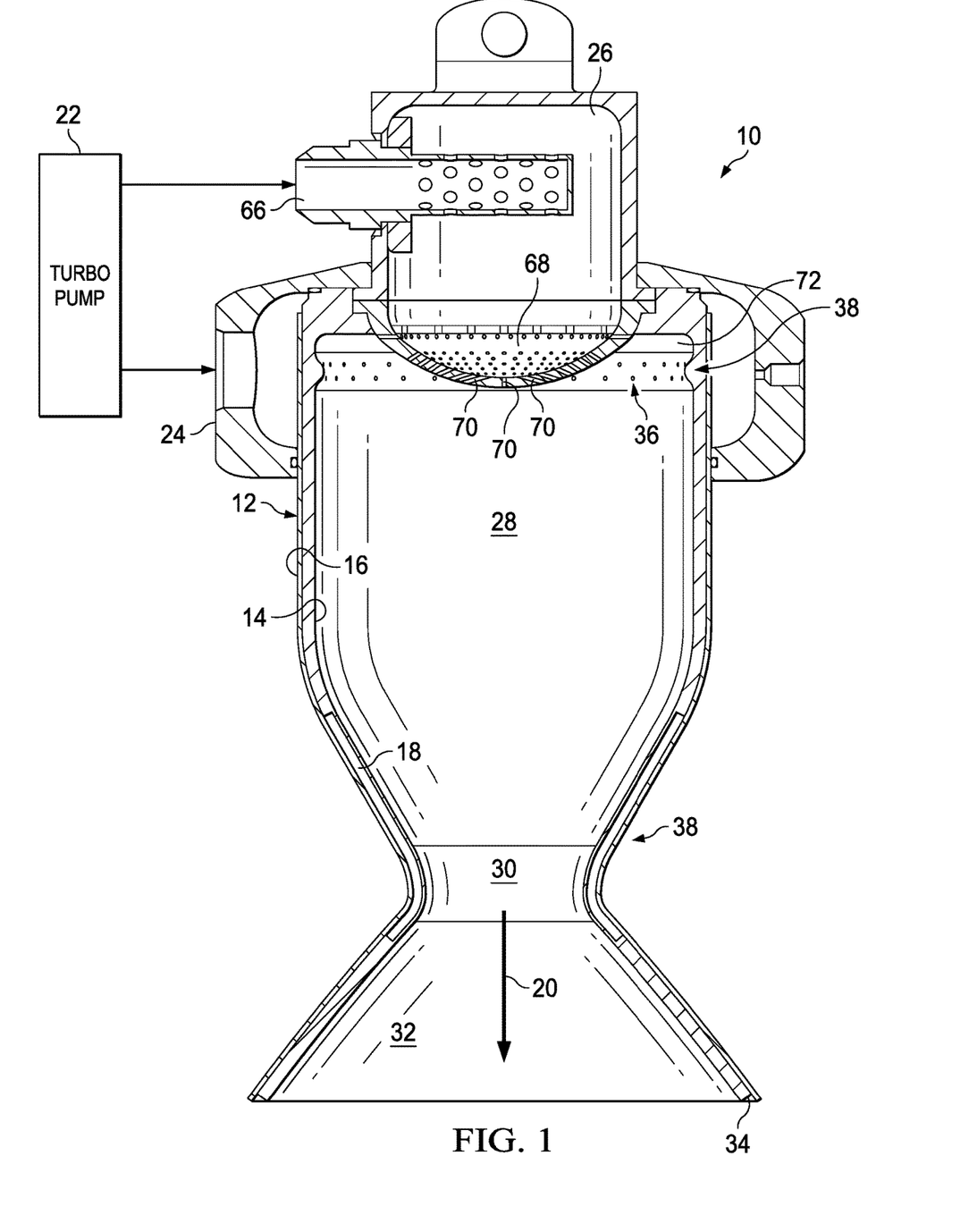
FIG. 1 depicts a side view of a cross section of a liquid rocket engine having a thruster body configured to cool an inner surface by transferring thermal energy to propellant flowing through plural cooling channels integrated in thruster body.

Referring now to FIG. 1, a side view depicts a cross section of a liquid rocket engine 10 having a thruster body 12 configured to cool an inner surface 14 by transferring thermal energy to propellant flowing through plural cooling channels 18 integrated in thruster body 12. To generate thrust along a thrust axis 20, liquid rocket engine 10 has a turbopump 22 that introduces fuel to a fuel manifold 24 and oxygen to an oxygen manifold 26. Under high pressure generated by turbopump 22, fuel and oxygen mix and burn as set forth in greater detail below within a combustion chamber 28. In the example embodiment, kerosene fuel and liquid oxygen mix and burn to create combustion temperatures of approximately 3500 degrees Kelvin and pressures of approximately 1000 PSI. Energy released by burning fuel in combustion chamber 28 generates thrust with a supersonic airflow by passing through a throat 30 and out a nozzle 32 formed in thrust body 12. In various embodiments, liquid rocket engine 10 may integrate combustion chamber 28, throat 30 and nozzle 32 in different types of structures and with various materials to achieve thrust by translating energy released by burning fuel into a gas flow. Those of skill in the art will recognize that thermal management of thruster body interior surface 14 as described herein will adapt to other types of liquid rocket engine throat and nozzle structures.

Cooling channels 18 provide a structure integrated within thruster body 12 through which propellant passes to remove thermal energy from internal surface 14 to the propellant. Absent transfer of thermal energy from internal surface 14 to the propellant, the temperature of thruster body 12 would exceed its melting point, resulting in catastrophic failure. In the example embodiment, cooling channels 18 support a flow of fuel from fuel manifold 24 in an averse direction along thrust axis 20 to nozzle 32 where a convolution manifold 34 redirects the flow in a reverse direction to fuel port openings 36. During travel through cooling channels 18 in the averse and reverse directions, fuel absorbs thermal energy while remaining in a liquid state due to high flow speed provided by turbopump 22. Upon release into combustion chamber 28 through fuel port openings 36, heated fuel rapidly vaporizes to mix with oxygen for efficient burning and recycling of thermal energy absorbed in the cooling process. In the example embodiment, fuel port openings 36 are small diameter openings, such as between 0.5 and 1.5 mm, drilled directly from interior surface 14 into a cooling channel 18 so that fuel injects directly into combustion chamber 28. Alternatively, cooling channels 18 terminate at an internal surface extension 38 that accumulates fuel from cooling channels 18 for direct injection into combustion chamber 28. Direct injection means that fuel injects directly through drilled fuel port openings 36 without additional injector structure; however, in alternative embodiments, additional fuel injector structures may be added, such as swirl hollow core or solid core fuel injectors. Although the example embodiment injects fuel at an upper location within combustion chamber 28, in alternative embodiments, fuel port openings may be drilled to inject fuel at alternative locations located closer to throat 30.

During passage through cooling channels 18, fuel absorbs thermal energy to reduce the temperature of internal surface 14. Transfer of thermal energy across liquid fuel at a high pressure and high flow rate is reduced due to boundary layers and stratifications in the flow that reduces thermal transfer efficiency. In effect, a temperature gradient is formed with higher temperatures in the fuel located near internal surface 14 and lower temperatures located in the fuel near external surface 16. In order to improve thermal transfer across fuel flowing through cooling channels 18, one or more predetermined structures are integrated with the cooling channels 18, as set forth in greater detail below, to increase heat rejection by providing an unsteady viscous and thermal boundary layers that mix thermally-stratified layers of fuel. In the example embodiments set forth below, the predetermined structures integrated in the cooling channels include variations in depth of the cooling channel along the thrust axis in repeated contiguous patterns, such as a sine wave. The repeated variations in depth provide unsteadiness of the dynamic and thermal boundary layers of the fuel through the thickness of the flow. In an ideal if perhaps extreme example, thermal boundary layers are unsteady starting from zero to a finite value at every wave length of geometry change so that temperature gradients change from almost infinite to finite values. In an ideal example heat transfer across the flow theoretically increases by 10-15% at the geometry depth transitions.

Figure 2:
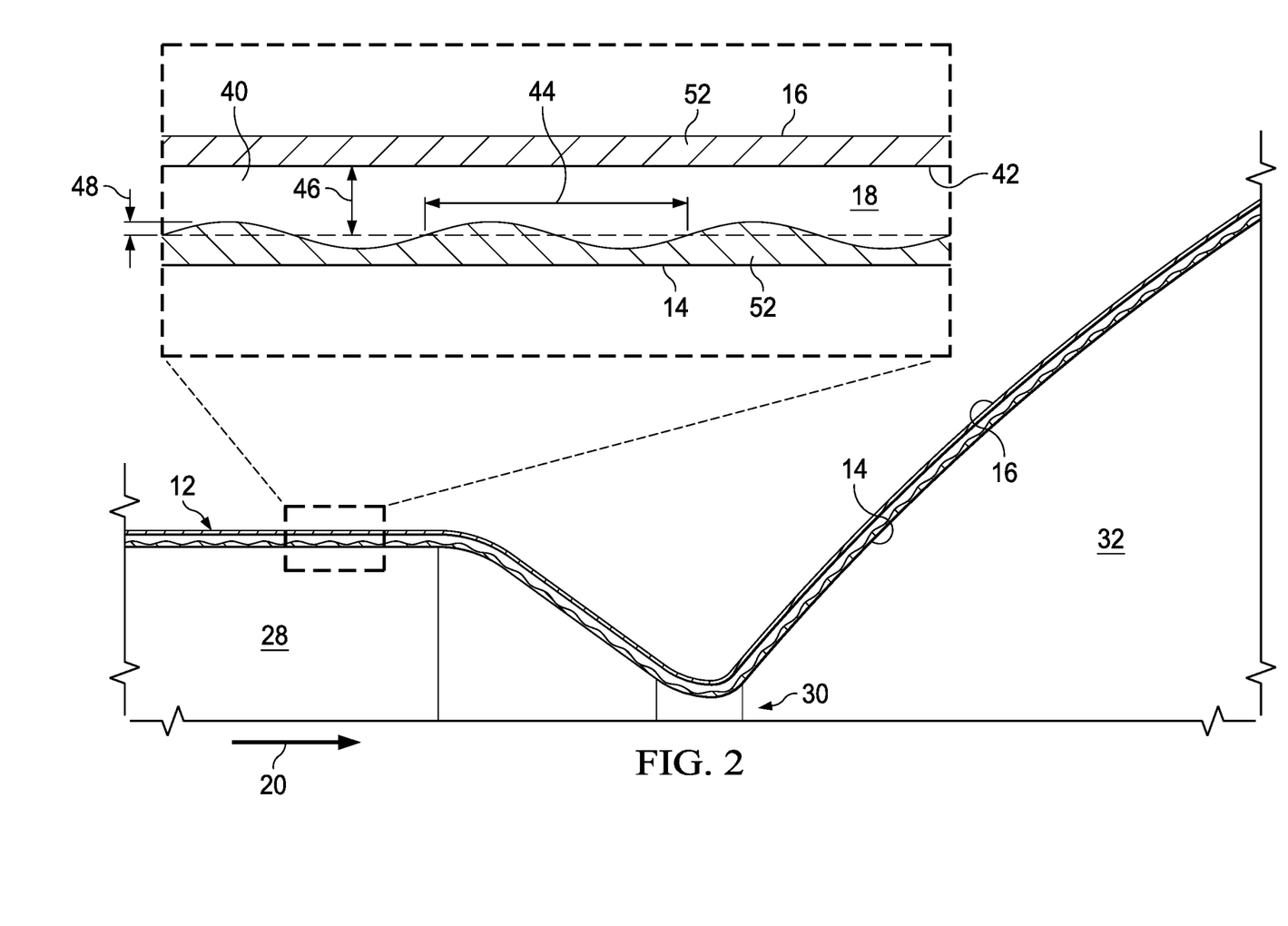
FIG. 2 depicts a cross sectional view of a cooling channel having a variable depth inner surface disposed along a thrust axis with a sinusoidal form repeated for plural consecutive wavelengths.

Referring now to FIG. 2, a cross sectional view depicts a cooling channel 18 having a variable depth inner surface 42 disposed along thrust axis 20 with a sinusoidal form repeated for plural consecutive wavelengths 44. In the example of FIG. 2, variable depth of cooling channel 18 is formed in the cooling channel lower wall 50 proximate internal surface 14 of thruster body 12 while the cooling channel upper wall 52 proximate external surface 16 has a flat surface. As described in greater detail below, the variable depth of cooling channel 18 may be defined instead by the upper wall proximate external surface 16, by both lower wall 50 and upper wall 52, and/or by side walls that separate cooling channels 18 from each other. In the example embodiment, the dimensions of the sinusoidal form are proportional to the average depth 46 of cooling channel 18. Specifically, the amplitude 48 of the sinusoidal form integrated in lower wall 50 is twenty percent of average depth 46 and the wavelength 44 is ten times average depth 46. In various embodiments, insubstantial changes to the proportions described above may be made based upon specific design goals for thermal management. For example, variations in manufacture may vary the dimensions as may adaptations to conform to curves of thruster body 12. In one example embodiment, average depth 46 of cooling channel 18 is set from 2 to 5 mm, an average width of the channel is set from 1 to 5 mm, and an average distance between cooling channels is set at 1 to 2 mm. The dimensions of cooling channel 18 and spacing between cooling channels 18 are set to achieve a desired thermal management of material of thruster body 12 and may depend upon the thermophysical properties of propellant passing through cooling channels 18, the thermal conductivity and melting point of material used to construct thruster body 12, and the propellant flow velocity. Thermal efficiency considerations that define distance between cooling channels 18 are addressed further below.

Figure 3:
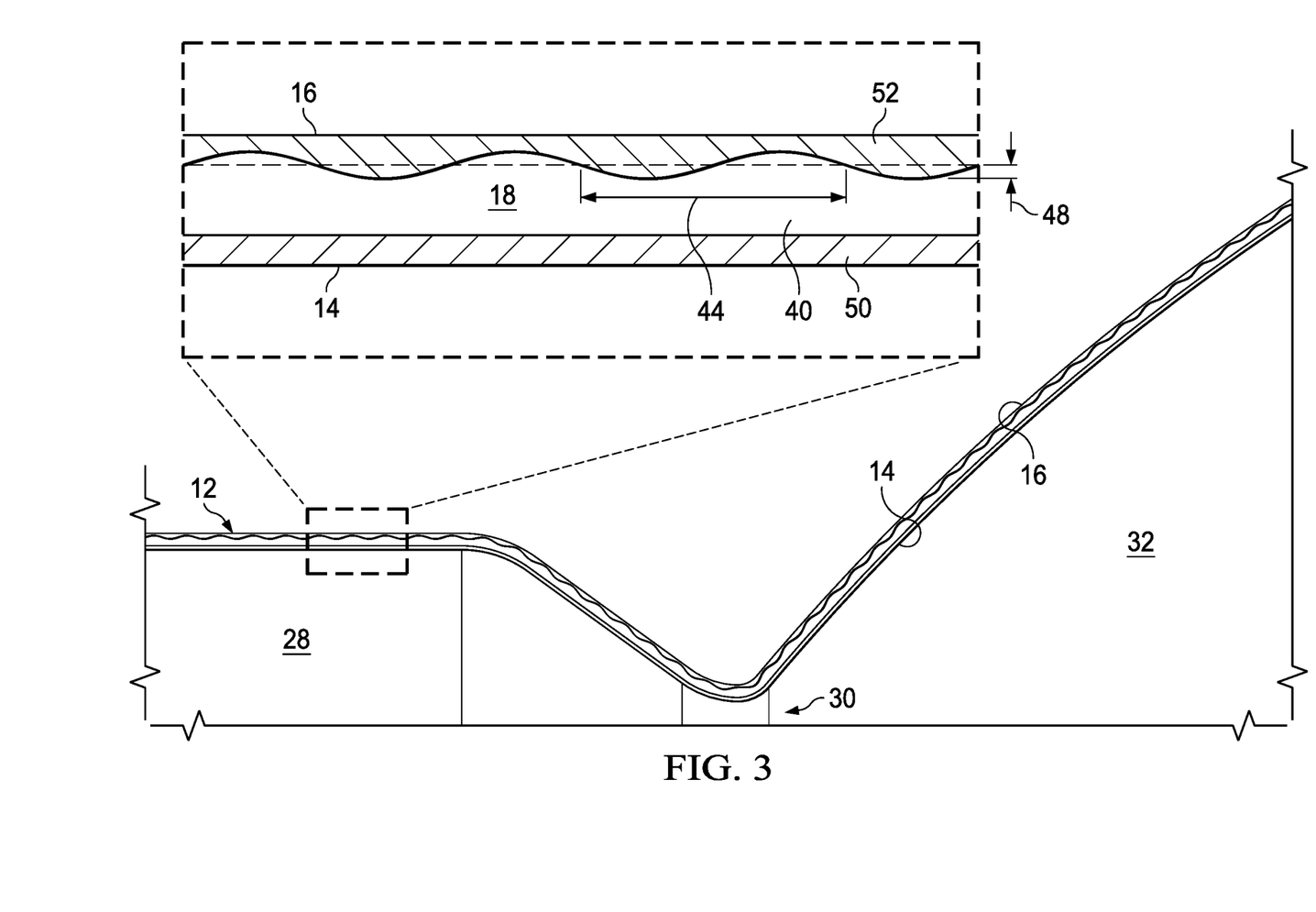
FIG. 3 depicts a cross sectional view of a cooling channel having a variable depth outer surface disposed along a thrust axis with a sinusoidal form repeated for plural consecutive wavelengths.
Figure 4A:
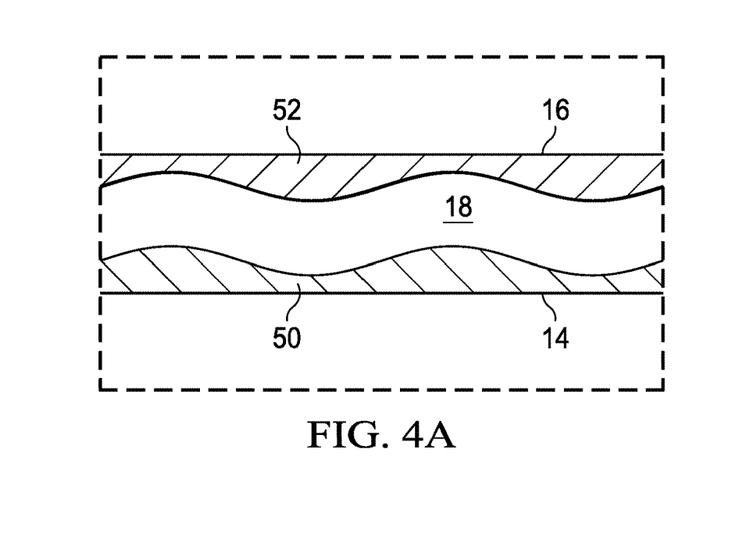
FIGS. 4A and 4B depict a cooling channel having a wavy surface at both the upper surface and lower surface.
Figure 4B:
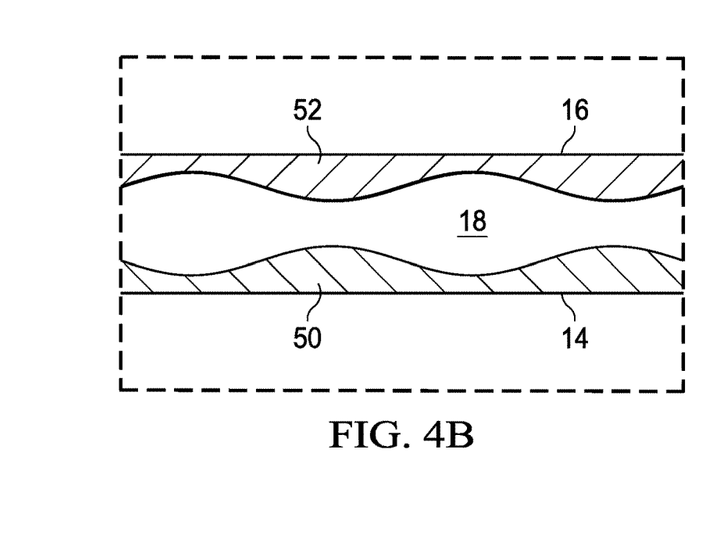

Referring now to FIG. 3, a cross sectional view depicts a cooling channel 18 having a variable depth outer surface disposed along thrust axis 20 with a sinusoidal form repeated for plural consecutive wavelengths 44. In the example embodiment of FIG. 3, upper surface 52 of cooling channel 18 has the sinusoidal wave form to reduce thermal stratification of propellant flowing through cooling channel 18. In one example embodiment, manufacture of a wavy lower surface is performed by milling the cooling channel with the desired bottom surface into a solid metal thruster body 12, filling the cooling channel with wax, and then electroplating metal, such as nickel, over the wax so that, once the wax is removed, cooling channel 18 has the desired sinusoidal form. In another example embodiment, manufacture of a wavy upper surface is performed by milling a cooling channel with a smooth lower surface, filling the cooling channel with wax, forming the wavy surface in the wax, and then electroplating metal over the wavy form of the wax. In alternative embodiments depicted by FIGS. 4A and 4B, cooling channel 18 has a wavy surface at both the upper surface 52 and lower surface 50. FIG. 4A illustrates cooling channel 18 with opposing walls having in phase sinusoidal form, while FIG. 4B illustrates opposing walls with 180 degrees out of phase sinusoidal form. The opposing wavy surfaces are referred to as a "peristaltic" profile.

Figure 5:
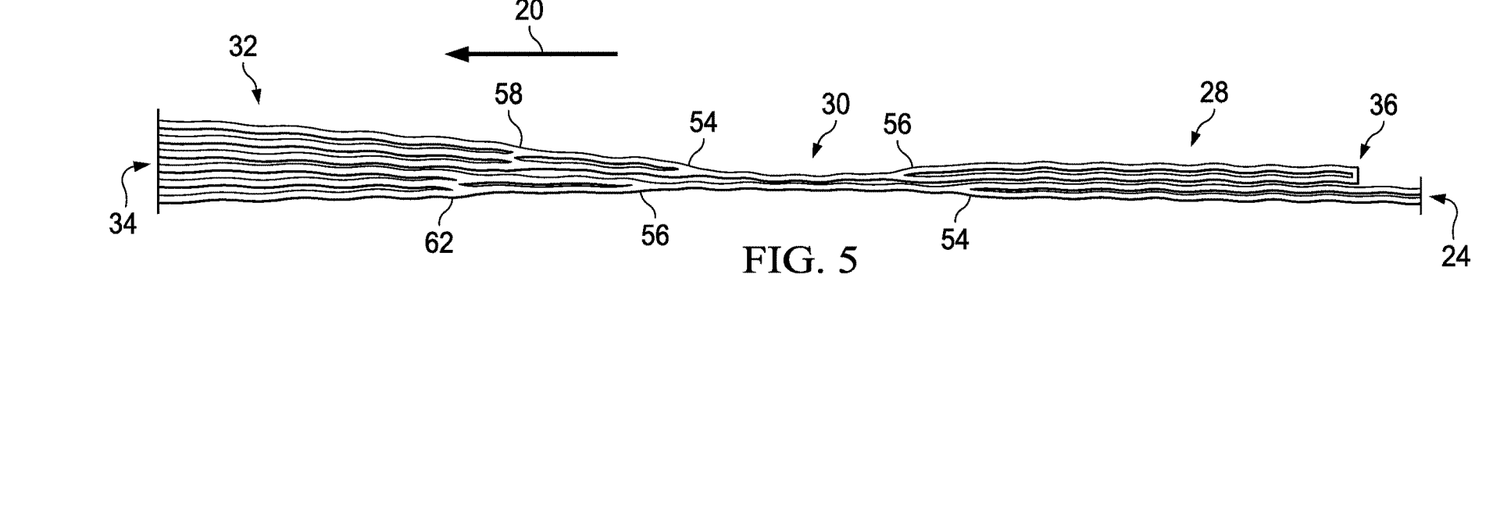
FIG. 5 depicts an upper cross sectional view of plural cooling channels disposed substantially parallel to each other and running along the thrust axis of a thruster body, the cooling channels having a wavy surface that enhances thermal dissipation to the propellant.

Referring now to FIG. 5, an upper cross sectional view depicts plural cooling channels 18 disposed substantially parallel to each other and running along the thrust axis 20 of thruster body 12, the cooling channels having a wavy surface that enhances thermal dissipation to the propellant. In the example embodiment, the cooling channel 18 inner surfaces have a variable depth in a circumferential orientation rather than at interior surface 14 and exterior surface 16 of thruster body 12. Propellant, such as kerosene fuel, passing through cooling channels 18 has thermal stratification disrupted by side wall wavy surfaces similar to that describe above with the upper and lower surfaces. In one example embodiment, all four sides within a cooling channel 18 may include variable depth, with opposing sides in phase and or out of phase. Although the example embodiment depicts the same pattern of variable depth along the entire length of thrust axis 20, in alternative embodiments, the use of variable depth wall structures may change along the length of cooling channel 18 to adapt thermal transfer efficiency provided by the cooling channels at different locations of thruster body 12. For example, variable depth wall structures may vary as cooling channels bifurcate and trifurcate to fit within changes to the circumference of thruster body 12 along the length of thrust axis 20, such as to adapt to changing fuel flow rates through cumulatively more narrow cooling channels.

In the example embodiment depicted by FIG. 5, fuel enters cooling channels 18 from a fuel manifold 24 and travels in an averse direction to convolution manifold 34, where the flow is reversed to travel to fuel ports 36 in a reverse direction. As thruster body 12's circumference narrows from the combustion chamber 28 to the throat 30, a convergent bifurcation 54 merges fuel from two cooling channels 18 into a single cooling channel that passes through throat 30. The effect under high pressure is to increase fuel flow rate through the reduced cumulative passageway size. Once cooling channel 18 passes into nozzle 32, an increasing circumference is adapted to with a divergent bifurcation 62 that divides fuel of the single cooling channel 18 into two separate cooling channels; followed by a divergent trifurcation 62 that divides fuel of the two cooling channels 18 into three cooling channels 18. In the reverse direction, an opposite cooling channel 18 path adapts to the circumference narrowing with a convergent trifurcation from three to two cooling channels; followed by a convergent bifurcation from two to one cooling channel that passes through throat 30. After throat 30, a divergent bifurcation 56 divides the one cooling channel into two cooling channels that feed into ports 36. Thermal conditions of thruster body 12 is managed by the dimensions and shape of the cooling channels 18 and the structure between the cooling channels, show in FIG. 5 as wavy side walls. Large side walls disposed between cooling channels 18 will heat to increased temperatures where cooling fuel flow is more distant.

In various embodiments, determining dimensions for cooling channels 18, including "fin" spacing between cooling channels 18, involves some experimentation and modeling so that thruster body 12 thermal constraints are maintained while using a turbopump of reduced size and power. Increased thermal transfer resulting from variable depth cooling channel structures provides increased flexibility in the design process due to the increase in thermal transfer through cooling fuel flows. In one example embodiment, the fin width of material between cooling channels 18 is between 1 and 2 mm, the average depth of cooling channels 18 is 2 to 5 mm and the width of cooling channels 18 is 1 to 5 mm. In determining the optimal dimensions for a specific set of thermophysical properties, a ratio of dimensions provides a guideline to achieve desired thermal constraints with sufficient physical strength of thruster body 12. In one example embodiment, maximum fin efficiency may be expected where the physical dimensions of the cooling channel have a ratio of fin width divided by channel width of 0.15 and a ratio of channel depth divided by channel width of between 1 and 2. Although these dimensions provide maximum fin efficiency, the fin width may in some cases offer insufficient bonding of galvanic material electroplate over cooling channels 18, such as at the high pressures generated at a combustion chamber and pumped through the cooling channels. To ensure adequate structural strength, a ration of fin width divided by channel width of between 0.15 and 1.5. A ratio of greater than 1.5 results in fin efficiency of less than that available from annular channels that lack fins.

Referring now back to FIG. 1, the side view depicts a cross section of combustion chamber 28 to illustrate cross impinged propellant jets that establish toroidal vortex and longitudinal flow patterns. The toroidal vortex flow pattern enhances propellant mixing and manages oxygen manifold thermal conditions at the headend 72 of combustion chamber 28. The longitudinal flow of propellant and combustion products formed in combustion chamber 28 below the vortex favors combustion stability and exhaust performance. Fuel port openings 36 provide liquid fuel to combustion chamber 28 after the fuel returns along the reverse direction of cooling channels 18 to directly inject preheated fuel into combustion chamber 28. In the example embodiment, fuel ports 36 are 0.5 to 1.5 mm diameter openings drilled through the body of combustion chamber 28 into each reverse cooling channel 18. To prevent premature mixing with oxygen and adequate directional control, the length (drill depth) of fuel ports 36 is three to five times the diameter of the fuel port 36. An internal surface extension or bump 38 extends somewhat into the interior of combustion chamber 28 to effectively shift the fuel injection location more towards the center of combustion chamber 28. In the example embodiment, fuel port 36 injection angles vary from a negative to a positive 45 degrees along a horizontal axis, i.e., perpendicular to thrust axis 20. In alternative embodiments, fuel ports 36 may be drilled along the length of combustion chamber 28 and may include openings that feed fuel from averse cooling channel flow. In the example embodiment, fuel injects directly into combustion chamber 28 from drilled ports without the use of specialized injectors or specialized material, such as expensive heat resistant metal. In alternative embodiments, some specialized injectors may be included at some of the fuel ports 36, such as swirl hollow core or solid core fuel injectors.

Liquid oxygen provided from a distribution pipe 66 into manifold 26 is injected into combustion chamber 28 through an injector 68 located at the headend of combustion chamber 28. In the example embodiment, injector 68 has a convex elliptical shape that extends as a hemispherical portion downward from the headend and into combustion chamber 28 with liquid oxygen injected through distributed ports 70. Ports 70 have a length of three to five times their diameter with the number and distribution of ports provided to obtain a balanced mixture with fuel as described further below. In the example embodiment, liquid oxygen injector 68 is constructed from copper and/or stainless steel having an average wall thickness of 0.2 inches. Alternative embodiments are constructed with materials having non-isotropic thermoconductivity in radial and transverse directions. For example, liquid oxygen injector 68 has a central core layer made by machining a high thermoconductivity material that has additional layers of low thermoconductivity materials "sandwiched" to provide non-isotropic thermal properties.

Generally, ports 70 inject oxygen to interact with fuel injected by ports 36 so that vortex patterns form to mix fuel and oxygen while also managing thermal conditions at the headend 72 of combustion chamber 28. Fuel is injected from combustion chamber inner surface 14 towards the center of combustion chamber 28 while oxygen is injected from an opposite direction towards thruster body 12. Fuel and oxygen injection streams impinge at a location determined by the momentum of each stream. Fuel and oxygen impinge at a distance away from combustion chamber inner surface 14 and away from liquid oxygen injector 68 so that a combustion zone occurs within the volume of combustion chamber 28 rather than at thruster body 12 wall 14. The cross impinged propellant injection streams create a novel and unique flow field within combustion chamber 28 that mixes combustion materials, maintains combustion away from thruster body 12 wall 14 and maintains a stable flame front. The flow patterns include a toroidal vortex at the upper portion of combustion chamber 28 and a longitudinal flow of the propellant and combustion products in the rest of the chamber below the vortex. In various embodiments, the relative location and injection angles of ports 36 and 68 may vary to establish desired flow patterns for varied combustion chamber sizes and propellant mass flow rates. Those of skill in the art will recognize that specific design parameters to achieve efficient fuel consumption within combustion chamber 28 will vary based upon a number of factors. For example, maintaining combustion chamber wall 14 material thermal constraints will depend upon variations in fuel flow rates in cooling channels 18 that also impact fuel pressure and fuel mass flow into combustion chamber 18. Cooling efficiencies achieved by improved combustion chamber cooling channels thus indirectly impact the geometrical location of oxygen and fuel impingement by defining fuel port injection pressure and fuel rate. The impingement location in turn defines a flame front that impacts thermal characteristic across combustion chamber 28 wall 14. For example, locating fuel and oxygen impingement away from combustion chamber wall 14 involves selection of fuel injection pressures and injection angles that, in turn, depend upon cooling channel 18 flow rates and pressure as well as oxygen injection pressures and injection angles. A balancing of these factors achieves efficient fuel consumption with reduced structural weights and injector complexity. Creation of desired fuel and oxygen flow patterns, including vortex flow patterns, formed within combustion chamber 28 is further described below.

Figure 6:
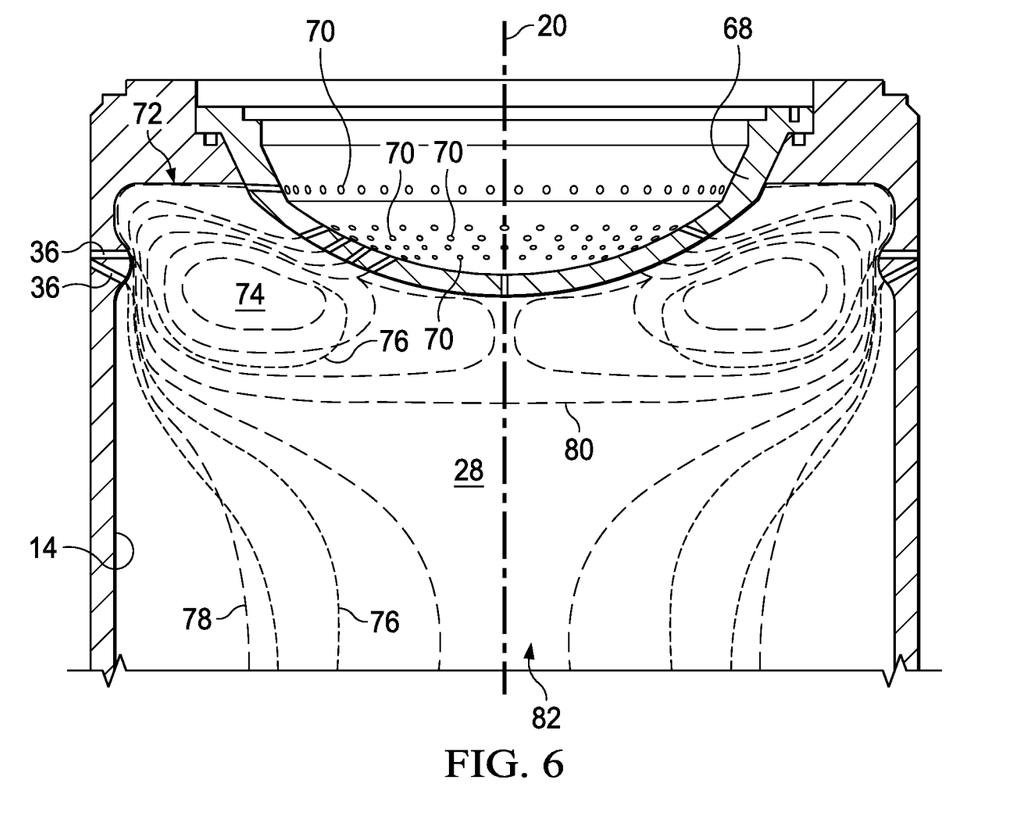
FIG. 6 depicts a side cross sectional view of an example combustion chamber embodiment having fuel and oxygen injection that creates a toroidal vortex flow.

Referring now to FIG. 6, a side cross sectional view depicts an example combustion chamber embodiment of fuel and oxygen injection that creates a toroidal vortex flow 74. In the example embodiment, first and second fuel injection ports 36 inject fuel into combustion chamber 28 at first and second injection angles. The upper injection port 36 injects fuel at a right angle to combustion chamber wall 12 while the low injection port 36 injects fuel at a slight downward angle towards a more central position of combustion chamber 28. A plurality of oxygen injection ports 70 direct oxygen to impinge with injected fuel so that toroidal vortex 74 forms in a donut region disposed around oxygen injector 68 at headend 72 of combustion chamber 28. In the example embodiment, an upper oxygen injector 70 is disposed proximate surface of headend 72 of combustion chamber 28 so that oxygen flows parallel the headend surface and at a right angle to combustion chamber wall 14. Other oxygen injector ports 70 are aligned to impinge against fuel injected by upper fuel port 36 so that oxygen flow is forced upward and around the upper definition of toroidal vortex 74 and across fuel ports 36. As is illustrated by fuel stream lines 76 and oxygen stream lines 78, rotational motion about vortex 74 acts to mix fuel and oxygen for improved vaporization and combustion as the fuel and oxygen enter an axial flow region 82. The upper portion of toroidal vortex 74 is a predominantly oxygen-rich flow that acts to cool the injection region and combustor headend 72 with flow across headend 72 and evaporation of oxygen proceeding from injectors 70. The upper portion of toroidal vortex 74 impinges across droplets of fuel proceeding from fuel injectors 36 to encourage evaporation and atomization of fuel. In vortex 74, any unburned oxygen and fuel droplets recirculate with a high relative velocity back towards oxygen injector 68 to carry oxygen streamline 78 across the face of injector 68, which further cools the combustion chamber headend 72 by evaporation of liquid oxygen. The effect of toroidal vortex 74 is to act as a mixer and flame holder for any unburned droplets that otherwise would tend to travel directly from the injectors to the thruster body throat. As fuel and oxygen mix through the action of toroidal vortex 74, the mixed flow travels towards axial flow region 82, which has a predominantly fuel-rich composition to redistribute oxygen rich flow in a radial direction. Toroidal vortex 74 has a finite volume with a donut shape so that oxygen stream lines 78 define a separatix 80 as a virtual surface that separates recirculating oxygen flow of vortex 74 from downstream longitudinal flow in axial flow region 82. The axial component of the flow in vortex 74 is directed towards headend 72 while the axial component of flow region 82 is directed towards an exit through the nozzle in the volume of the longitudinal flow below separatix 80. Shears formed between flows enhance mixing at the shear boundaries.

Figure 7:
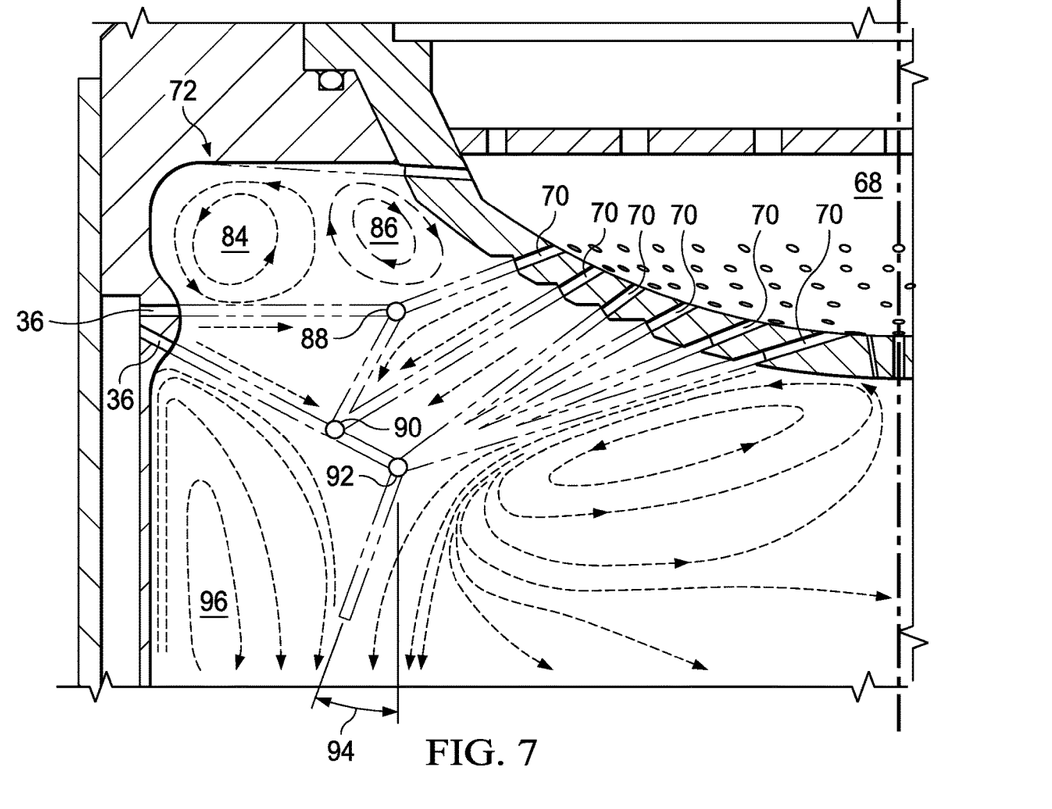
FIG. 7 depicts a side cross sectional view of an alternative embodiment of a combustion chamber having fuel and oxygen injection to create a separate fuel vortex and oxygen vortex at the combustion chamber headend.

Referring now to FIG. 7, a side cross sectional view depicts an alternative embodiment of a combustion chamber 28 having fuel and oxygen injection to create a separate fuel vortex 84 and oxygen vortex 86 at the combustion chamber headend 72. The example embodiment of FIG. 7 differs from that of FIG. 6 in that oxygen injector 68 does not have an oxygen injection port 70 that injects oxygen parallel to the upper surface of combustion chamber headend 72. Removing the oxygen injection port from the top row of oxygen injector 68 results in creation of two separate toroidal vortex proximate headend 72, a fuel vortex 84 have a fuel-rich flow, and an oxygen vortex 86 having an oxygen rich flow. Vortex 84 and 86 form as a result of a first impingement point where fuel injected from an upper fuel injection port 36 impinges against oxygen injected at the fuel from an upper oxygen injection port 70. Recirculating oxygen droplets in oxygen vortex 86 and recirculating fuel droplets in fuel vortex 84 cool headend 72 via evaporation and aid in atomization and mixing of propellant. Fuel injected from a lower fuel injection port 36 and a lower oxygen injector port 70 form a second impingement location 90 about which another vortex may form below vortexes 84 and 86. In addition, fuel injected from the lower injection port 36 forms a third impingement point 92 with oxygen injected by lower oxygen injector ports 70. As a result of the multiple impingements, a recirculating vortex flow mixes fuel across a larger volume, such as may be effective with high combustor contraction area ratios (i.e., greater than 3) and elongated combustion chambers.

In both of the example embodiments depicted by FIGS. 6 and 7, the location of fuel/oxygen impingement and resulting vortex flows may be manipulated by adjusting the injection pressure of fuel versus oxygen as well as the injection angles and the number of injector ports associated with impingement locations. The momentum of fuel and oxygen impingement has a spray angle alpha 94 adjustable by changes in injection pressure and angle. An oxygen to fuel (O/F) ratio associated with an impingement is managed by adapting the momentum ratio of fuel versus oxygen injection, such as with injection pressure and/or the number of injectors associated with each impingement point. For instance, in the example embodiment of FIG. 7, the injection port configuration defines different combustion zones with different O/F ratios to provide a staged combustion with separate combustion zones. The separate combustion zones allow management of temperature distribution, such as within a flue gas vortex 96 of FIG. 7 versus the axial flow region 82 of FIG. 6. In this manner, the energy release surface with a stoichiometric mixture ratio occurs close to separatrix 80 for improved thermal management of headend 72. Energy release is not flat, as is typical with conventional nozzle plate injectors. Rather, the energy release surface is radially distributed among stable zones with different temperatures, densities and thermochemical characteristics, such as O/F ratio, different molecular weights and specific heat ratios. As a result, combustion stability provides favorable prevention of acoustic instabilities.

Referring generally to FIGS. 6 and 7, separation of flows through generation of toroidal vortexes provides improved thermal management and combustion efficiency for the liquid rocket engine. One example of thermal management is separatrix 80, which provides a virtual surface to separate toroidal vortices 74 depicted on opposing sides of liquid oxygen injector 68 from downstream longitudinal flow of axial flow region 82. Toroidal vortex 74 is axisymmetric in the circumferential direction. The axial component of the flow in the volume of vortex 74 is directed towards headend 72 while the axial component of the flow from region 82 is directed towards the exit of combustion chamber 28 below separatrix 80. In addition, a slight downward injection of oxygen from the center of injector 68 provides additional separation of separatrix from the bottom surface of injector 68. The result is reduced thermal energy release in the proximity of oxygen injector 68 and more efficient axial flow towards the combustion chamber nozzle.

Toroidal vortex 74 has a finite volume with a "donut" shape that fills up with trapped fuel, oxygen, active radicals and combustion products. Propellant trapped in toroidal vortex 74 has an almost infinite residence time to provide improved mixing and completion of chemical reactions. Heat released from the chemical reactions provides heating of propellant in toroidal vortex 74. Toroidal vortex 74 serves as a flame holder existing in the volume of the combustion chamber without anchoring to a combustion chamber wall. The toroidal vortex represents the first combustion region in which chemical reactions occur to support a stable combustion with smooth pressure rise and drop during startup and shutdown of the liquid rocket engine. In testing, hard starts of the liquid rocket engine were not detected. The downstream longitudinal flow represents a second combustion region where unburned propellant completes combustion.

In summary, the novel flow field created by cross impinged injection of fuel and oxygen as illustrated by toroidal vortex 74 results in injected fuel separation into two parts: one part of injected fuel goes into the toroidal vortex for burning in the first combustion region; the second part of injected fuel goes below separatrix 80 into the longitudinal flow where it is distributed uniformly across radial direction through the cross-section of combustion chamber 28. In the longitudinal flow, the most favorable conditions for combustion occurs across the cross section of combustion chamber 28 except for the boundary layer near wall 14, where temperature and oxygen concentrations are lower. Generally, liquid rocket engines tend to have a rich oxygen to fuel ratio below the stoichiometric ratio and thus lean on oxygen. Oxygen consumption within the toroidal vortex is increased by the flow pattern so that oxygen mixture is even leaner as the flow passes to the longitudinal axial flow region 82. Thus, fuel in the flow volume will burn first while fuel closer to wall 14 is less likely to burn due to lower temperatures and less oxygen. Unburned fuel along wall 14 is fractioned and pyrolyzed into the gaseous phase to leave unburned carbon deposits on wall 14. The deposited carbon produces an insulation layer of soot while the gaseous phase passing along wall 14 produces a "film cooling" effect that reduces or eliminates the need for film cooling of wall 14. Thus, toroidal vortex 74 improves thermal management along combustion chamber wall 14 by encouraging more efficient combustion within the toroidal vortex flow and through the axial flow, indirectly resulting in insulative effects related to reduced fuel burning efficiency along wall 14. In one example embodiment, the internal surface of combustion chamber 28 may be coated with a thermal barrier (TBC) layer to further enhance combustion efficiency by raising temperatures proximate wall 14 so that average volumetric temperature and pressure will be higher with associated higher combustion efficiency.

Figure 8:
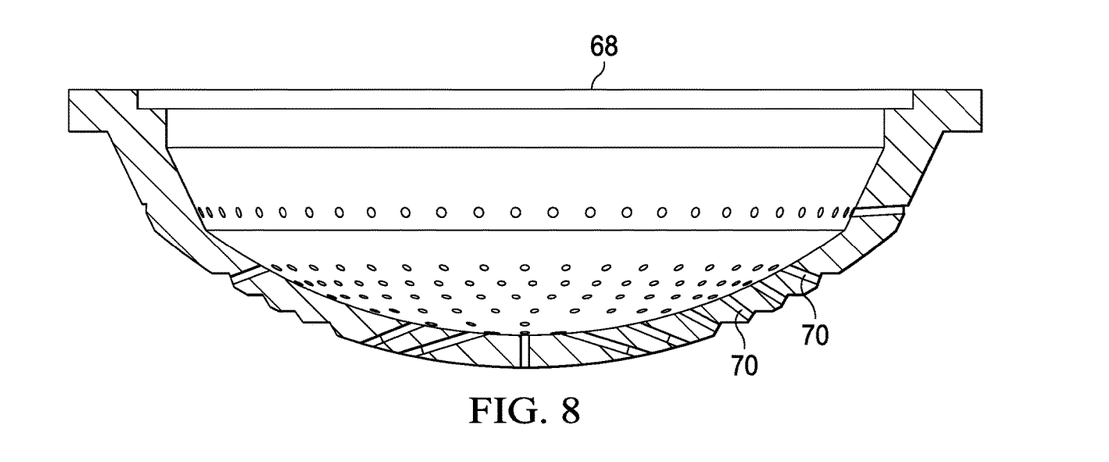
FIG. 8 depicts a side cross sectional view of an example oxygen injector for injecting liquid oxygen from a combustion chamber headend.
Figure 9:
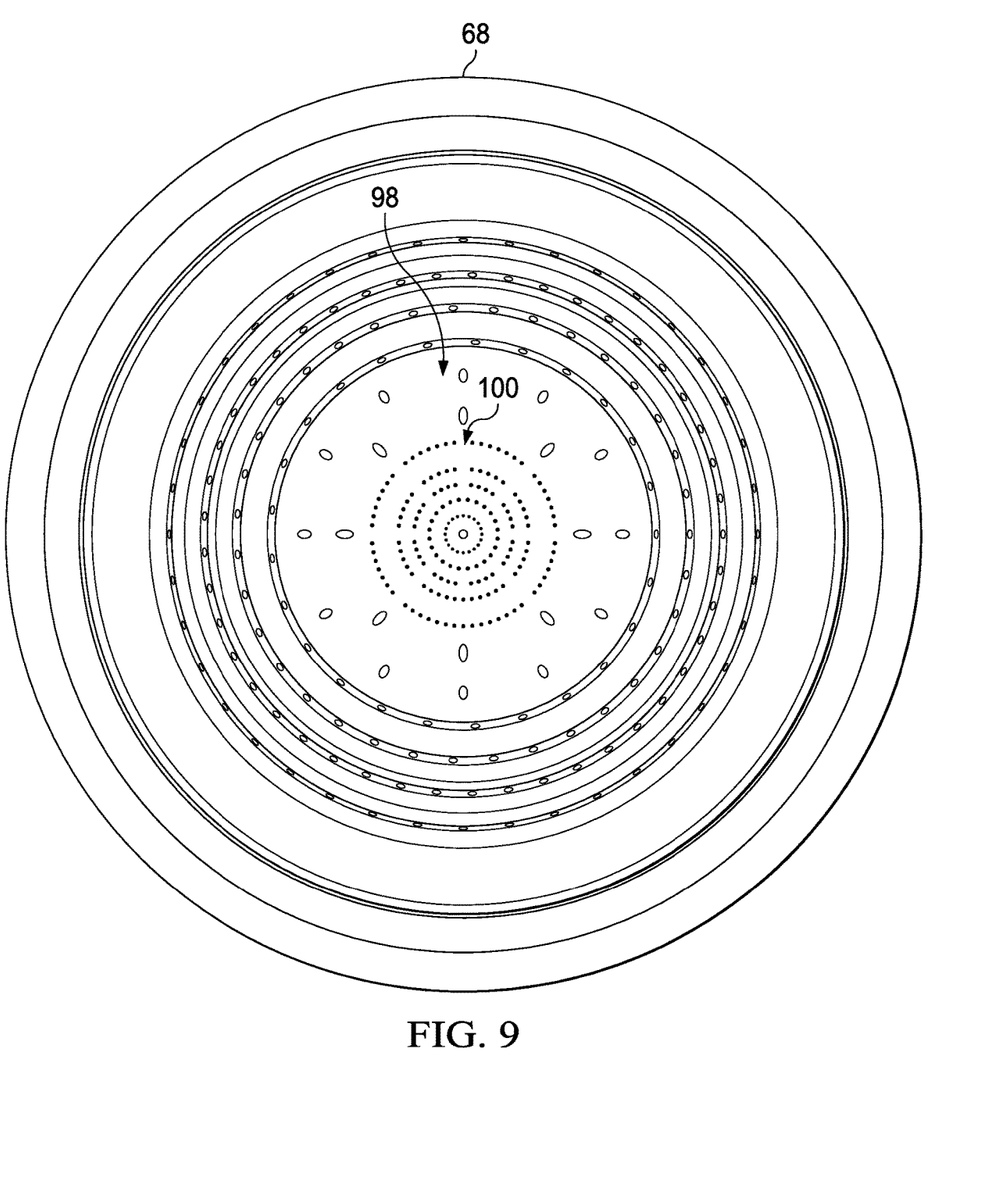
FIG. 9 depicts a bottom view of the oxygen injector viewed from within the combustion chamber.
Figure 10:
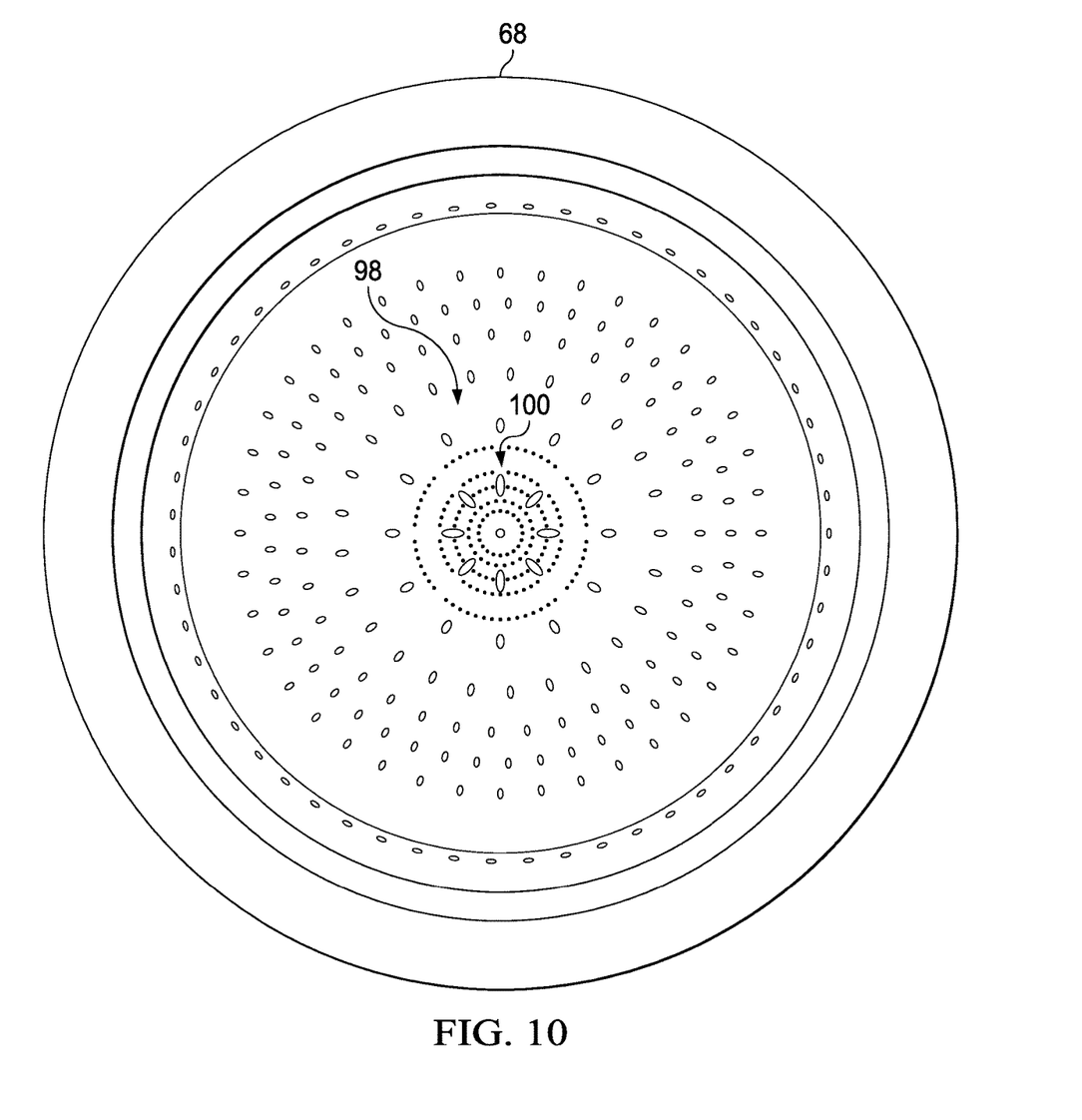
FIG. 10 depicts an upper view of the oxygen injector viewed from within the oxygen manifold.
Figure 11:
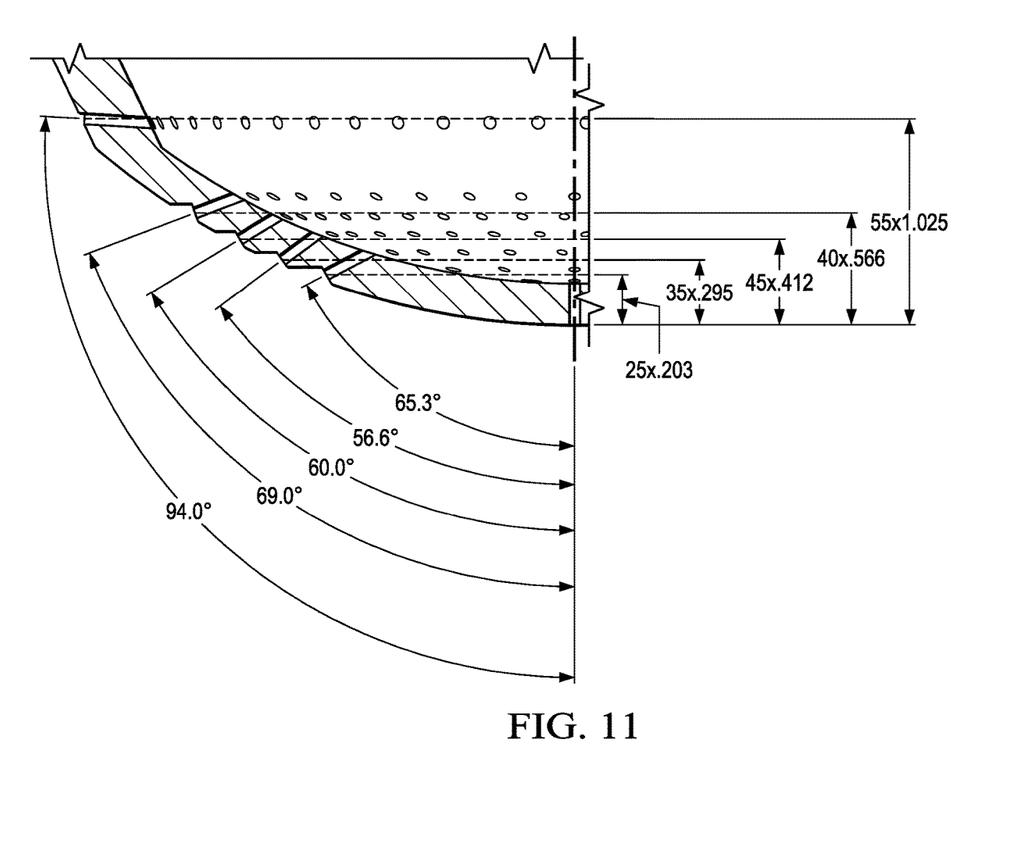
FIG. 11 depicts injection angles drilled into an example embodiment of an oxygen injector.

Referring now to FIG. 8, a side cross sectional view depicts an example oxygen injector 68 for injecting liquid oxygen from a combustion chamber headend. As is described above, oxygen injector 68 has plural injector ports 70 from which liquid oxygen is injected into combustion chamber 28. In the example embodiment, injection ports are arranged in circular rows about the circumference of oxygen injector 68's hemispherical shape. The number of rows of injector ports determines the mass flow rate of oxygen from injector 68, with the example embodiment having seven rows of injector ports. However, to adapt the O/F ratio for combustion zones as describe above, different sized injector ports formed in injector 68 may be used. In the example embodiment, approximately 90% of oxygen mass flow rate proceeds from the five injector ports of the outer circumference of injector 68 while the remaining 10% passes through the two inner rows of ports. FIG. 9 depicts injector 68 as viewed from the combustion chamber and FIG. 10 depicts injector 68 from the interior of injector 68. The two most inner rows of injector ports 70, labeled as 100 for the inner most row and 98 for next row out, have smaller injector ports 70 with a reduced mass flow rate. For example, ports in rows 98 and 100 are formed by electrode discharge machine (EDM) to have a smaller diameter. These smaller ports help to define separatrix 80 so that temperatures at oxygen injector 68 are managed as described in greater depth below. FIG. 11 depicts the injection inclination angle for the example embodiment depicted by FIG. 6.

Oxygen injector 68 has a cost-efficient design that simplifies liquid rocket engine assembly. For example, injector ports 70 are drilled at desired angles without special materials, complicated tooling or specialized injector parts. Oxygen injector 68 can be welded to oxygen manifold 26 to exclude all interfaces between oxygen and fuel without seals or gaskets. Layers of copper and steel provide non-isotropic conductivity as a defense against high heat flux from flame within combustion chamber 28. Additional layers of material may be included having a low conductivity to reduce heat influx into the cryogenic oxygen manifold so that oxygen remains cold and far from boiling. In one example embodiment, conductivity distribution is non-isotropic, meaning that thermal conductivity perpendicular to the surface and through the material of injector 68 remains low while conductivity along the surface on both the flame exterior side and oxygen interior side is high. Various types of Nano-materials may be suitable for such lateral thermal transfer. Alternatively, a "sandwich" structure of various metals may provide desirable thermal transfer characteristics. For example, a core copper material (or alternatively silver or gold) is first formed and then coated with thin layers of nickel, steel and/or zirconium on both the exterior combustion chamber side and interior oxygen manifold side, such as with galvanic deposition. The central copper core provides good heat conductivity perpendicular to the surface of injector 68 while the rejecting thermal transfer from the exterior surface to the core. The central core dissipates heat in radial directions towards the chamber walls which serve as a heat sink. The outer surface coated by less thermally conductive material reduces passage of thermal energy from the combustion chamber to the liquid oxygen manifold to reduce heat penetration to the liquid oxygen and distribute cold temperatures uniformly on the liquid oxygen side of injector 68. One goal in the design of injector 68 is to use a thickness optimized to obtain maximum heat transfer along the surface with minimum heat transfer in the perpendicular direction. In the example embodiment, a thickness of approximately 0.2 inches is used.

Although the present invention has been described in detail, it should be understood that various changes, substitutions and alterations can be made hereto without departing from the spirit and scope of the invention as defined by the appended claims.

What is claimed is:
1. A liquid rocket engine comprising:
a thruster body having an exterior surface and an interior surface, the interior surface forming a combustion chamber, throat and nozzle aligned along a thrust axis;
an oxygen manifold interfaced with the combustion chamber to provide oxygen to the combustion chamber;
a fuel manifold interfaced with the combustion chamber to provide fuel to the combustion chamber, the fuel burning with the oxygen to release energy, the energy propelling exhaust from the combustion chamber through the throat and out the nozzle along the thrust axis to create thrust;
plural cooling channels integrated in the thruster body between the interior and exterior surfaces along the thrust axis; and
a pump forcing fuel through the plural cooling channels, the fuel receiving thermal energy from the thruster body interior surface and transferring the thermal energy to the thruster body exterior surface;

wherein the plural cooling channels each have an inner surface that defines a variable depth along the thrust axis in a circumferential orientation, the variable depth having a sinusoidal form of plural consecutive wavelengths, at least some of the plural cooling channels having convergent bifurcation and divergent bifurcation to pass through a reduced circumference of the nozzle.

2. The liquid rocket engine of claim 1 wherein the at least one cooling channel has an averse portion proceeding from the combustion chamber to the nozzle and a reverse portion interfaced with the averse portion, the reverse portion proceeding from the nozzle to the combustion chamber, the sinusoidal form integrated in the cooling channel along substantially all of the length of the averse and reverse portions.

3. The liquid rocket engine of claim 2 wherein the sinusoidal form is further located on a side of the at least one cooling channel proximate to the thruster body interior surface.

4. The liquid rocket engine of claim 2 wherein the sinusoidal form is further located on a side of the at least one cooling channel proximate to the thruster body exterior surface.

5. The liquid rocket engine of claim 1 wherein the at least one cooling channel has opposing inner surfaces defining a variable depth along the thrust axis, each opposing inner surface having the sinusoidal form of plural consecutive wavelengths.

6. The liquid rocket engine of claim 5 wherein the opposing inner surface each have the sinusoidal form in phase with the other opposing inner surface.

7. The liquid rocket engine of claim 5 wherein the opposing inner surfaces each have the sinusoidal form out of phase with the other opposing surface.

8. The liquid rocket engine of claim 1 wherein:
the thruster body has a circumference around the thrust axis;
the plural cooling channels are disposed about substantially all of the circumference; and
each of the plural cooling channels have at least one inner surface that defines the variable depth along substantially all of the length of the thrust body.

9. The liquid rocket engine of claim 8 wherein a wall between each adjacent of the plural cooling channels varies in a sinusoidal form of plural wavelengths along substantially all of the length of the thrust body.

10. The liquid rocket engine of claim 1 wherein the sinusoidal form has an amplitude of substantially twenty percent of an average of the variable depth and a wavelength of substantially ten times the average of the variable depth.

11. A method for managing thermal energy of a liquid rocket engine thruster body, the method comprising:
pumping propellant through plural cooling channels formed in the thruster body, the propellant receiving thermal energy from an interior wall of the thruster body and transferring the thermal energy to an exterior wall of the thruster body; and
mixing the propellant in the plural cooling channels by passing the propellant over consecutive wave patterns formed in at least the inner surface of each of the plural cooling channels, the mixing providing unsteady boundary layers in the propellant, the consecutive wave patterns having a circumferential orientation, at least some of the plural cooling channels having convergent bifurcation and divergent bifurcation to pass through a reduced circumference of the thruster body at a nozzle.

12. The method of claim 11 wherein the consecutive wave patterns comprise a sinusoidal form of plural wavelengths.

13. The method of claim 12 wherein the plural cooling channels have an average depth and the sinusoidal form has an amplitude of substantially twenty percent of the average depth and a wavelength of substantially 10 times the average depth.

14. The method of claim 12 wherein the consecutive wave patterns are formed on opposing sides of each cooling channel in phase with each other.

15. The method of claim 12 wherein the consecutive wave patterns are formed on opposing sides of each cooling channel out of phase with each other.

16. The method of claim 11 further comprising:
injecting the propellant from one or more of the plural cooling channels into the thruster body at a combustion chamber through an opening formed in the one or more of the plural cooling channels, the propellant injected directly through the opening.

17. A method for managing thermal energy of a liquid rocket engine thruster body, the method comprising:
pumping propellant through plural cooling channels formed in the thruster body, the propellant receiving thermal energy from an interior wall of the thruster body and transferring the thermal energy to an exterior wall of the thruster body; and
mixing the propellant in the plural cooling channels by passing the propellant over consecutive wave patterns formed in at least one surface of each of the plural cooling channels, the mixing providing unsteady boundary layers in the propellant;
wherein the consecutive wave patterns are formed on opposing sides of each cooling channel in phase with each other and having a circumferential orientation.

* * * * *